United States Patent
Oh et al.

(10) Patent No.: US 8,902,982 B2
(45) Date of Patent: Dec. 2, 2014

(54) DEPTH MAP CODING AND DECODING APPARATUS AND METHOD

(75) Inventors: Kwan Jung Oh, Hwaseong Si (KR); Jae Joon Lee, Seoul (KR); Du Sik Park, Suwon-si (KR); Ho Cheon Wey, Seongnam-si (KR)

(73) Assignee: Samsung Electronics Co., Ltd., Suwon (KR)

(*) Notice: Subject to any disclaimer, the term of this patent is extended or adjusted under 35 U.S.C. 154(b) by 365 days.

(21) Appl. No.: 13/350,250

(22) Filed: Jan. 13, 2012

(65) Prior Publication Data
US 2012/0183066 A1 Jul. 19, 2012

Related U.S. Application Data

(60) Provisional application No. 61/434,594, filed on Jan. 20, 2011, provisional application No. 61/558,567, filed on Nov. 11, 2011.

(30) Foreign Application Priority Data

Jan. 17, 2011 (KR) .................. 10-2011-0004490
Sep. 15, 2011 (KR) .................. 10-2011-0092912

(51) Int. Cl.
*H04N 7/26* (2006.01)
*H04N 19/14* (2014.01)
*H04N 19/597* (2014.01)
*H04N 19/107* (2014.01)
*H04N 19/176* (2014.01)
*H04N 13/00* (2006.01)

(52) U.S. Cl.
CPC ... *H04N 19/00157* (2013.01); *H04N 19/00769* (2013.01); *H04N 19/0003* (2013.01); *H04N 19/00278* (2013.01); *H04N 13/0003* (2013.01)
USPC .................. 375/240.13; 375/240.16

(58) Field of Classification Search
CPC ................................. H04N 19/00157
See application file for complete search history.

(56) References Cited

U.S. PATENT DOCUMENTS

| | | | |
|---|---|---|---|
| 2004/0213348 A1* | 10/2004 | Kim et al. | 375/240.12 |
| 2006/0062302 A1* | 3/2006 | Yin et al. | 375/240.16 |
| 2006/0193385 A1* | 8/2006 | Yin et al. | 375/240.12 |
| 2007/0121728 A1* | 5/2007 | Wang et al. | 375/240.18 |
| 2007/0153892 A1* | 7/2007 | Yin et al. | 375/240.03 |
| 2007/0201564 A1* | 8/2007 | Joch et al. | 375/240.29 |
| 2009/0052534 A1* | 2/2009 | Wang et al. | 375/240.13 |
| 2010/0061447 A1* | 3/2010 | Tu et al. | 375/240.03 |
| 2010/0220790 A1* | 9/2010 | Jeon et al. | 375/240.16 |
| 2011/0038418 A1* | 2/2011 | Pandit et al. | 375/240.16 |

OTHER PUBLICATIONS

Jun Sung Park and Hyo Jung Song, "Selective Intra Prediction Mode Decision for H.264/AVC Encoders", World Academy of Science and Technology, vol. 13, Jan. 23, 2008.*

* cited by examiner

*Primary Examiner* — Sath V Perungavoor
*Assistant Examiner* — Janese Duley
(74) *Attorney, Agent, or Firm* — Staas & Halsey LLP

(57) ABSTRACT

An apparatus and method for coding and decoding a depth image are provided. The depth image coding apparatus predicts directivity of a current macro block using coded adjacent macro blocks. An intra-prediction mode that intra-codes the current macro block using the predicted directivity is included in intra-candidate coding modes. Priorities of intra-candidate coding modes and inter-candidate coding modes are arranged according to characteristics of a color image and coded. As a result, coding efficiency for a depth image may be increased.

26 Claims, 8 Drawing Sheets

DEPTH MAP CODING AND DECODING APPARATUS AND METHOD

CROSS-REFERENCE TO RELATED APPLICATIONS

This application claims the benefit under 35 U.S.C. §119 (e) of U.S. Provisional Application Nos. 61/434,594, filed on Jan. 20, 2011 and 61/558,567 filed on Nov. 11, 2011, in the U.S. Patent and Trademark Office, and the benefit under 35 U.S.C. §119(a) of Korean Patent Application No. 10-2011-0004490 and Korean Patent Application No. 10-2011-0092912 and Korean Patent Application No. 10-2011-0141112 respectively filed on Jan. 17, 2011 and Sep. 15, 2011 and Dec. 23, 2011, in the Korean Intellectual Property Office, the entire disclosures of which are incorporated herein by reference.

BACKGROUND

1. Field

Example embodiments of the following description relate to an apparatus and method for coding and decoding a depth image.

2. Description of the Related Art

A stereoscopic image refers to a 3-dimensional (3D) image that supplies shape information on both depth and space of an image. Whereas a stereo image merely supplies images of different views to left and right eyes of a viewer, respectively, the stereoscopic image is seen as if viewed from different directions as a viewer varies his or her point of view. Therefore, images taken from many different views are necessary for generation of the stereoscopic image. The images of different views may be applied to various fields including a free viewpoint television (TV), a 3D TV, and the like. The free viewpoint TV acquires and analyzes multiview images with respect to one scene, thereby freely varying viewpoints of an object. The 3D TV provides the viewer with a realistic 3D depth impression by supplying different images to the left and right eyes. However, since the images of different views have a great amount of data, it is very difficult to code and transmit the images in consideration of the network infrastructure, a terrestrial bandwidth, and the like.

Therefore, instead of coding and transmitting all video data having many different views, a depth image may be produced. When the depth image is coded and transmitted along with images of only part of the many different views, data size for coding may be reduced. The depth image expresses a distance between an object and a viewer in a color image by values from 0 to 255. Therefore, the depth image has similar characteristics to the color image. However, since the depth image is different from the color image, that is the depth image is flat, there is a demand for a more efficient coding method for the depth image.

SUMMARY

According to example embodiments, there may be provided a depth image coding apparatus including an intra-mode prediction unit to predict directivity of a current macro block using coded adjacent macro blocks, an intra-coding unit to intra-code the current macro block according to each of intra-candidate coding modes, an inter-coding unit to inter-code the current macro block according to each of the inter-candidate coding modes, and a coding mode determination unit to determine a coding mode having a lowest rate distortion optimization (RDO) cost among coding modes included in the intra-candidate coding modes and the inter-candidate coding modes as a coding mode of the current macro block, in consideration of priorities of the coding modes, wherein the intra-candidate coding modes comprise an intra-prediction mode for intra-coding using the predicted directivity.

The intra-prediction mode may include at least one selected from an intra-skip mode, an intra-direct mode, and an intra-direction mode, wherein the intra-skip mode fails to transmit predicted directivity information and a residual signal to a decoding apparatus, the intra-direct mode fails to transmit the predicted directivity information to the decoding apparatus, and the intra-direction mode fails to transmit the residual signal to the decoding apparatus.

The intra-skip mode may have a highest priority or a second-highest priority of the priorities of the coding modes included in the intra-candidate coding modes and the inter-candidate coding modes.

The predicted directivity may include one of a vertical direction that generates a prediction block by vertically expanding the current macro block from an upper boundary pixel, a horizontal direction that generates the prediction block by horizontally expanding the current macro block from a left boundary pixel, a discrete cosine (DC) direction that generates the prediction block using a mean value of the upper boundary pixel and the left boundary pixel of the current macro block, and a plane direction that generates the prediction block considering both the upper boundary pixel and the left boundary pixel of the current macro block.

The intra-candidate coding modes may be classified according to a difference in at least one of a macro block size, whether directivity information is coded, and existence of a residual signal regarding a luminance component of the macro block.

The inter-candidate coding modes may refer to one motion vector per macro block, and the inter-candidate coding modes may be classified according to a difference in at least one of a macro block size, whether the motion vector is coded, and whether a residual signal is coded.

The priorities of the coding modes included in the intra-candidate coding modes and the inter-candidate coding modes may be set such that the intra-candidate coding modes have higher priorities than the inter-candidate coding modes.

The priorities of the intra-candidate coding modes may be set such that a coding mode having a greater macro block size has a higher priority, a coding mode not coding directivity information has a higher priority than a coding mode coding the directivity information, a coding mode not coding a residual signal has a higher priority than a coding mode coding the residual signal, and a coding mode having directivity has a higher priority than a coding mode not having directivity.

The priorities of the inter-candidate coding modes may be set such that a coding mode having a greater macro block size has a higher priority, a coding mode not coding a motion vector has a higher priority than a coding mode coding the motion vector, and a coding mode not coding a residual signal has a higher priority than a coding mode coding the residual signal.

Information on the priorities of the coding modes included in the intra-candidate coding modes and the inter-candidate coding modes is preset or determined when a depth image is coded and then transmitted to a decoding apparatus.

The coding mode determination unit may vary the priorities of the coding modes included in the intra-candidate coding modes and the inter-candidate coding modes, according to a final determination of frequencies of the coding modes.

The current macro block may include one of a macro block of a depth image, a macro block of a black and white image, a macro block of a color image having a flat characteristic, and a macro block of an X-ray image.

The depth image coding apparatus may further include a deblocking filter unit to remove blocking by filtering a recovered block using the prediction block, wherein the deblocking filter unit performs filtering more strongly in an instance when either of blocks on both sides with reference to a block boundary is intra-coded, than in an instance when both of the blocks on both sides are inter-coded.

According to example embodiments, there may also be provided a depth image decoding apparatus including a coding mode recovery unit to confirm a coding mode of a coded macro block being received, an intra-mode recovery unit to predict directivity of the coded macro block using decoded adjacent macro blocks when the coding mode of the coded macro block is an intra-prediction mode, and an intra-decoding unit to generate a prediction block using the predicted directivity.

The coding mode recovery unit may confirm the coding mode of the coded macro block using information on priorities of coding modes included in intra-candidate coding modes and inter-candidate coding modes, and the intra-prediction mode may be included in the intra-candidate coding modes.

The coding mode recovery unit may vary the priorities of the coding modes included in the intra-candidate coding modes and the inter-candidate coding modes, according to a final determination of frequencies of the coding modes.

The information on the priorities of the coding modes included the intra-candidate coding modes and the inter-candidate coding modes may be preset or determined when a depth image is decoded and then received by a coding apparatus.

The predicted directivity may include one of a vertical direction that generates a prediction block by vertically expanding the coded macro block from an upper boundary pixel, a horizontal direction that generates the prediction block by horizontally expanding the coded macro block from a left boundary pixel, a DC direction that generates the prediction block using a mean value of the upper boundary pixel and the left boundary pixel of the coded macro block, and a plane direction that generates the prediction block considering both the upper boundary pixel and the left boundary pixel of the coded macro block.

The intra-prediction mode may include at least one selected from an intra-skip mode, an intra-direct mode, and an intra-direction mode, wherein the intra-skip mode does not receive predicted directivity information and a residual signal from a coding apparatus, the intra-direct mode receives the residual signal but does not receive the predicted directivity information from the coding apparatus, and the intra-direction mode does not transmit the residual signal to the decoding apparatus, but transmits the predicted directivity information.

The depth image decoding apparatus may further include a deblocking filter unit to remove blocking by filtering a recovered block using the prediction block. The deblocking filter unit performs filtering more strongly in an instance when either of blocks on both sides with reference to a block boundary is intra-coded than, in an instance when both of the blocks on both sides are inter-coded.

The foregoing and/or other aspects are achieved by providing a depth image coding method including predicting directivity of a current macro block using coded adjacent macro blocks, intra-coding the current macro block according to each of intra-candidate coding modes, inter-coding the current macro block according to each of inter-candidate coding modes when the current macro block corresponds to a P-picture or a B-picture, and determining a coding mode having a lowest rate distortion optimization (RDO) cost among coding modes included in the intra-candidate coding modes and the inter-candidate coding modes as a coding mode of the current macro block, in consideration of priorities of the coding modes, wherein the intra-candidate coding modes include an intra-prediction mode for intra-coding using the predicted directivity.

The intra-prediction mode may include at least one selected from an intra-skip mode, an intra-direct mode, and an intra-direction mode, wherein the intra-skip mode may code predicted directivity information and a residual signal and does not transmit the residual signal and the information to a decoding apparatus, the intra-direct mode may code the predicted directivity information and does not transmit the information to the decoding apparatus, and the intra-direction mode does not transmit the residual signal to the decoding apparatus.

The intra-skip mode may have a highest priority or a second-highest priority of the priorities of the coding modes included in the intra-candidate coding modes and the inter-candidate coding modes.

The predicted directivity may include one of a vertical direction that generates a prediction block by vertically expanding the current macro block from an upper boundary pixel, a horizontal direction that generates the prediction block by horizontally expanding the current macro block from a left boundary pixel, a DC direction that generates the prediction block using a mean value of the upper boundary pixel and the left boundary pixel of the current macro block, and a plane direction that generates the prediction block considering both the upper boundary pixel and the left boundary pixel of the current macro block.

The foregoing and/or other aspects are also achieved by providing a depth image decoding method including confirming a coding mode of a coded macro block using information on priorities of coding modes included in intra-candidate coding modes and inter-candidate coding modes, predicting directivity of the coded macro block using decoded adjacent macro blocks when the coding mode of the coded macro block is an intra-prediction mode, and generating a prediction block using the predicted directivity.

Information on the priorities of the coding modes included in the intra-candidate coding modes and the inter-candidate coding modes may be preset or determined when a depth image is decoded.

The predicted directivity may include one of a vertical direction that generates a prediction block by vertically expanding the coded macro block from an upper boundary pixel, a horizontal direction that generates the prediction block by horizontally expanding the coded macro block from a left boundary pixel, a DC direction that generates the prediction block using a mean value of the upper boundary pixel and the left boundary pixel of the coded macro block, and a plane direction that generates the prediction block considering both the upper boundary pixel and the left boundary pixel of the coded macro block.

The intra-prediction mode may include at least one selected from an intra-skip mode, an intra-direct mode, and an intra-direction mode, wherein the intra-skip mode does not receive predicted directivity information and a residual signal from a coding apparatus, the intra-direct mode receives the residual signal but does not receive the predicted directivity information from the coding apparatus, and the intra-direction mode does not transmit the residual signal to the decoding apparatus, but transmits the predicted directivity information.

Additional aspects, features, and/or advantages of example embodiments will be set forth in part in the description which follows and, in part, will be apparent from the description, or may be learned by practice of the disclosure.

EFFECTS

According to example embodiments, directivity of a current macro block is predicted using coded adjacent macro blocks and the current macro block is intra-coded using the predicted directivity. Priorities of intra-candidate coding modes and inter-candidate coding modes are arranged according to characteristics of a color image, and coded. As a result, coding efficiency for a depth image may be increased.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
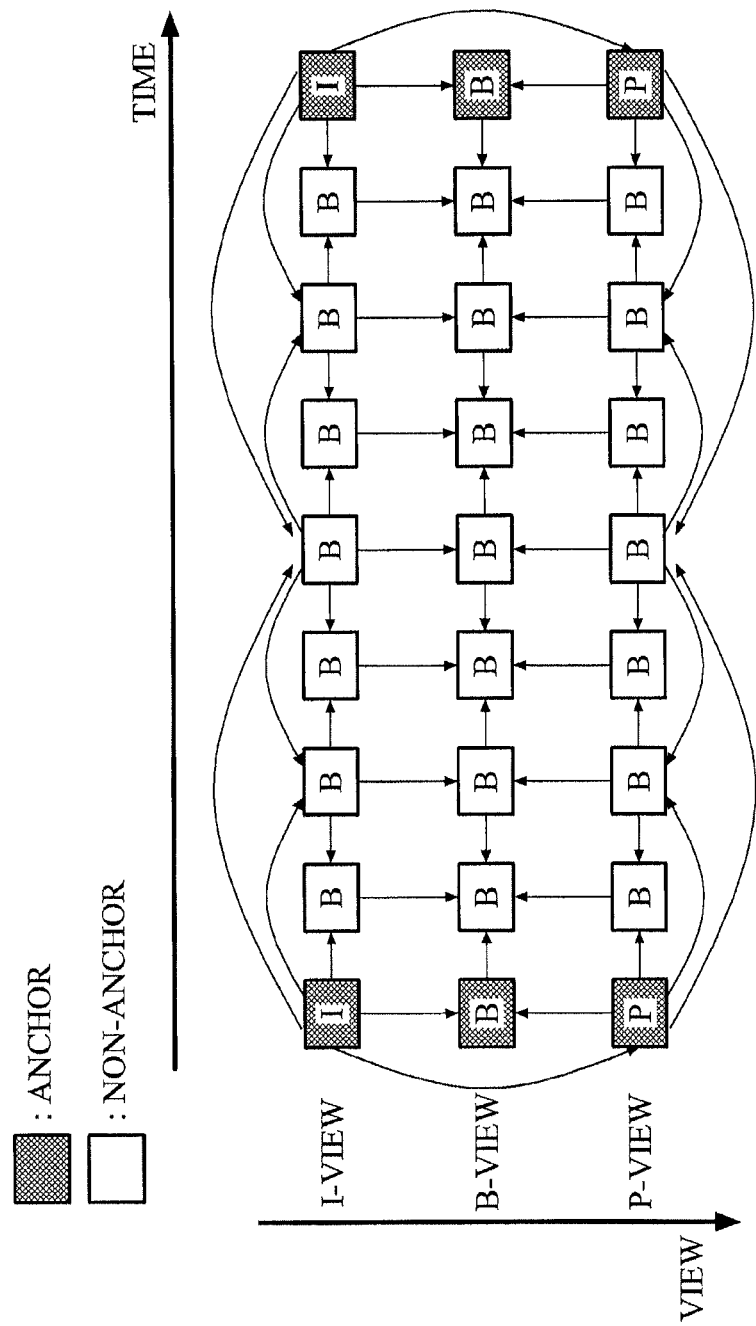
FIG. 1 illustrates a coding structure for a multiview image according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

The example embodiments relate to an apparatus and method for coding and decoding a depth image. Prior to a detailed description about the apparatus and method, a coding structure and coding mode for the depth image will be checked first.

FIG. 1 illustrates a coding structure for a multiview image according to example embodiments.

Referring to FIG. 1, the depth image may include the coding structure for the multiview image. The coding structure may generally include an anchor frame that performs coding using only a reference between adjacent views, that is, inter-view reference, and a non-anchor frame using both a time direction reference and a view direction reference. That is, the anchor frame is necessary for random access. The anchor frame is distinctive from conventional single-view coding mostly in that coding is performed using only inter-view prediction. The coding structure for the multiview image shown in FIG. 1 is a multiview video coding (MVC) structure that codes input images of three views, that is, a left view, a center view, and a right view, using a group of picture (GOP) 8.

When coding the multiview image, redundancy among images may be reduced since the concept of a hierarchical B picture is basically applied with respect to a time axis and a view axis. When coding the image having the three views, the MVC structure shown in FIG. 1 may code the left-view image, the right-view image, and then the center-view image sequentially. Here, similarly to conventional 2D image coding, the left-view image may be coded by motion estimation that finds a similar area from previous images and removes temporal redundancy. When the right-view image is coded, since the left-view image already coded is used as a reference image, not only is the temporal redundancy removed through the motion estimation but also view redundancy generated between views is removed through disparity estimation. When the center-view is coded, both the left-view image and the right-view image may be used as reference images. Therefore, the disparity estimation may be performed in both directions to remove the view redundancy.

In the MVC structure shown in FIG. 1, an I-view refers to an intra-view image coded without prediction from an image of another view, like the left-view image. A P-view refers to a predictive view image coded by prediction in one direction from an image of another view, like the right-view image. In addition, a B-view refers to an interpolative view image coded in both directions from a left-view image and a right-view image, like the center-view image.

Each image, for example, a picture may be divided into an I-picture denoting an intra-picture, a P-picture denoting a predictive picture, and a B-picture denoting an interpolative picture according to a coding type. The I-picture codes the picture without performing inter-picture prediction. The P-picture performs the inter-picture prediction using a reference picture only in a forward direction and codes a difference between the P-picture and a prediction value. The B-picture codes the picture by performing the inter-picture prediction using reference pictures in both forward and backward directions.

H.264/advanced video coding (AVC) according to the conventional art uses various macro block modes when coding macro blocks. H.264/AVC selects an optimal mode from among the various macro block modes and codes the macro blocks. Also, H.264/AVC codes and transmits information on a mode type for every macro block. Here, to minimize bits used for the mode information of the macro block, priorities may be given to the macro block modes in order of higher frequency of occurrence and fewer bits to be coded when the macro blocks are coded. Table 1, Table 2, and Table 3 below show various macro block modes used for frame coding in the I-picture, the P-picture, and the B-picture in H.264/AVC.

TABLE 1

| mb_type | Name of mb_type | transform_size_8 × 8_flag | MbPartPredMode (mb_type, 0) | Intra16 × 16 PredMode | CodedBlock Pattern Chroma | CodedBlock Pattern Luma |
|---|---|---|---|---|---|---|
| 0 | I_N × N | 0 | Intra_4 × 4 | na | | |
| 0 | I_N × N | 1 | Intra_8 × 8 | na | | |
| 1 | I_16 × 16_0_0_0 | na | Intra_16 × 16 | 0 | 0 | 0 |
| 2 | I_16 × 16_1_0_0 | na | Intra_16 × 16 | 1 | 0 | 0 |
| 3 | I_16 × 16_2_0_0 | na | Intra_16 × 16 | 2 | 0 | 0 |
| 4 | I_16 × 16_3_0_0 | na | Intra_16 × 16 | 3 | 0 | 0 |
| 5 | I_16 × 16_0_1_0 | na | Intra_16 × 16 | 0 | 1 | 0 |
| 6 | I_16 × 16_1_1_0 | na | Intra_16 × 16 | 1 | 1 | 0 |
| 7 | I_16 × 16_2_1_0 | na | Intra_16 × 16 | 2 | 1 | 0 |
| 8 | I_16 × 16_3_1_0 | na | Intra_16 × 16 | 3 | 1 | 0 |
| 9 | I_16 × 16_0_2_0 | na | Intra_16 × 16 | 0 | 2 | 0 |
| 10 | I_16 × 16_1_2_0 | na | Intra_16 × 16 | 1 | 2 | 0 |
| 11 | I_16 × 16_2_2_0 | na | Intra_16 × 16 | 2 | 2 | 0 |
| 12 | I_16 × 16_3_2_0 | na | Intra_16 × 16 | 3 | 2 | 0 |
| 13 | I_16 × 16_0_0_1 | na | Intra_16 × 16 | 0 | 0 | 15 |
| 14 | I_16 × 16_1_0_1 | na | Intra_16 × 16 | 1 | 0 | 15 |
| 15 | I_16 × 16_2_0_1 | na | Intra_16 × 16 | 2 | 0 | 15 |
| 16 | I_16 × 16_3_0_1 | na | Intra_16 × 16 | 3 | 0 | 15 |
| 17 | I_16 × 16_0_1_1 | na | Intra_16 × 16 | 0 | 1 | 15 |
| 18 | I_16 × 16_1_1_1 | na | Intra_16 × 16 | 1 | 1 | 15 |
| 19 | I_16 × 16_2_1_1 | na | Intra_16 × 16 | 2 | 1 | 15 |
| 20 | I_16 × 16_3_1_1 | na | Intra_16 × 16 | 3 | 1 | 15 |
| 21 | I_16 × 16_0_2_1 | na | Intra_16 × 16 | 0 | 2 | 15 |
| 22 | I_16 × 16_1_2_1 | na | Intra_16 × 16 | 1 | 2 | 15 |
| 23 | I_16 × 16_2_2_1 | na | Intra_16 × 16 | 2 | 2 | 15 |
| 24 | I_16 × 16_3_2_1 | na | Intra_16 × 16 | 3 | 2 | 15 |
| 25 | I_PCM | na | na | na | na | na |

TABLE 2

| mb_type | Name of mb_type | NumMbPart (mb_type) | MbPartPredMode (mb_type, 0) | MbPartPredMode (mb_type, 1) | MbPartWidth (mb_type) | MbPartHeight (mb_type) |
|---|---|---|---|---|---|---|
| 0 | P_L0_16 × 16 | 1 | Pred_L0 | na | 16 | 16 |
| 1 | P_L0_L0_16 × 8 | 2 | Pred_L0 | Pred_L0 | 16 | 8 |
| 2 | P_L0_L0_8 × 16 | 2 | Pred_L0 | Pred_L0 | 8 | 16 |
| 3 | P_8 × 8 | 4 | na | na | 8 | 8 |
| 4 | P_8 × 8ref0 | 4 | na | na | 8 | 8 |
| inferred | P_Skip | 1 | Pred_L0 | na | 16 | 16 |

TABLE 3

| mb_type | Name of mb_type | NumMbPart (mb_type) | MbPartPredMode (mb_type, 0) | MbPartPredMode (mb_type, 1) | MbPartWidth (mb_type) | MbPartHeight (mb_type) |
|---|---|---|---|---|---|---|
| 0 | B_Direct_16 × 16 | na | Direct | na | 8 | 8 |
| 1 | B_L0_16 × 16 | 1 | Pred_L0 | na | 16 | 16 |
| 2 | B_L1_16 × 16 | 1 | Pred_L1 | na | 16 | 16 |
| 3 | B_Bi_16 × 16 | 1 | BiPred | na | 16 | 16 |
| 4 | B_L0_L0_16 × 8 | 2 | Pred_L0 | Pred_L0 | 16 | 8 |
| 5 | B_L0_L0_8 × 16 | 2 | Pred_L0 | Pred_L0 | 8 | 16 |
| 6 | B_L1_L1_16 × 8 | 2 | Pred_L1 | Pred_L1 | 16 | 8 |
| 7 | B_L1_L1_8 × 16 | 2 | Pred_L1 | Pred_L1 | 8 | 16 |
| 8 | B_L0_L1_16 × 8 | 2 | Pred_L0 | Pred_L1 | 16 | 8 |
| 9 | B_L0_L1_8 × 16 | 2 | Pred_L0 | Pred_L1 | 8 | 16 |
| 10 | B_L1_L0_16 × 8 | 2 | Pred_L1 | Pred_L0 | 16 | 8 |
| 11 | B_L1_L0_8 × 16 | 2 | Pred_L1 | Pred_L0 | 8 | 16 |
| 12 | B_L0_Bi_16 × 8 | 2 | Pred_L0 | BiPred | 16 | 8 |
| 13 | B_L0_Bi_8 × 16 | 2 | Pred_L0 | BiPred | 8 | 16 |
| 14 | B_L1_Bi_16 × 8 | 2 | Pred_L1 | BiPred | 16 | 8 |
| 15 | B_L1_Bi_8 × 16 | 2 | Pred_L1 | BiPred | 8 | 16 |
| 16 | B_Bi_L0_16 × 8 | 2 | BiPred | Pred_L0 | 16 | 8 |
| 17 | B_Bi_L0_8 × 16 | 2 | BiPred | Pred_L0 | 8 | 16 |
| 18 | B_Bi_L1_16 × 8 | 2 | BiPred | Pred_L1 | 16 | 8 |
| 19 | B_Bi_L1_8 × 16 | 2 | BiPred | Pred_L1 | 8 | 16 |
| 20 | B_Bi_Bi_16 × 8 | 2 | BiPred | BiPred | 16 | 8 |
| 21 | B_Bi_Bi_8 × 16 | 2 | BiPred | BiPred | 8 | 16 |

TABLE 3-continued

| mb_type | Name of mb_type | NumMbPart (mb_type) | MbPartPredMode (mb_type, 0) | MbPartPredMode (mb_type, 1) | MbPartWidth (mb_type) | MbPartHeight (mb_type) |
|---|---|---|---|---|---|---|
| 22 | B_8 × 8 | 4 | na | na | 8 | 8 |
| inferred | B_Skip | na | Direct | na | 8 | 8 |

However, the macro block modes shown in Table 1, Table 2, and Table 3 are designed for a color image and therefore are inefficient when applied to a depth image. In a SKIP mode which reduces bits among the macro block modes most efficiently, macro block mode information and residual components are not coded. Therefore, a frequency of occurrence of the SKIP mode is lower in the depth image than in the color image.

A conventional SKIP mode (hereinafter, referred to as "inter SKIP mode") performs prediction from a motion vector of an adjacent macro block based on a median motion vector. Since the depth image having little texture is characterized mostly by flatness, efficiency of the inter SKIP mode is deemed to be unsatisfactory.

In addition, the depth image is provided generally in the form of 4:2:0 YUV. In this case, since chrominance signal values are all set to 128, a residual value is not generated with respect to chrominance components. Accordingly, in the conventional H.264/AVC, a macro block mode having chrominance residual is inefficient.

Moreover, in the conventional H.264/AVC, a coding method based on the motion vector is inefficient in the depth image except partial areas including textures. Also, bidirectional prediction (Bi-prediction) used for the B-picture in the conventional H.264/AVC is inefficient in the depth image. Thus, most of the conventional macro block modes designed for the color image is inefficient for application to the depth image. When a number of the macro block modes increases unnecessarily, coding efficiency is reduced because bits for coding the macro block information are also increased. Furthermore, prediction methods with respect to the macro block modes and the priorities of the macro block modes are designed for the color image, that is, inefficient for the depth image.

To overcome the foregoing limits, the example embodiments suggest an intra-prediction method that is commonly applicable to the I-picture, the P-picture, and the B-picture.

The intra-prediction method may include an intra-SKIP mode and an intra-Direct mode. The intra-SKIP mode and the intra-Direct mode will be described later with reference to FIG. 2.

Macro block modes unnecessary for depth image coding may be deleted and the priorities of the macro block modes may be changed to be appropriate for the depth image.

When changing the priorities of the macro block modes for depth image coding, a few matters are to be considered as follows.

First, the depth image is generally provided in the form of 4:2:0 YUV. In this case, since chrominance signal values are all set to 128, a residual value with respect to the chrominance signals is not generated. Therefore, among Intra 16×16 modes, mode types 5 to 12 and 17 to 24 for a case in which a coded block pattern (CBP) with respect to the chrominance component is not zero would be unnecessary and consequently may be deleted. In I_16×16_a_b_c, a denotes directivity of the intra 16×16 modes, b denotes a CBP with respect to the chrominance component, and c denotes a CBP information regarding a luminance component.

Second, in the depth image, complicated areas may be coded mostly by Intra 4×4 rather than by Inter 16×8, 8×16, and 8×8. In addition, frequency of intra occurrence is relatively high in the B-picture and the P-picture in case of the depth image, when compared to the color image. That is, the priorities of the various macro block modes in the example embodiments may be SKIP>Direct>Inter 16×16>Intra N×N>Inter 8×16>Inter 16×16>Inter P8×8>Intra16×16. In this case, the SKIP mode and the Direct mode are replaced with the suggested intra mode.

Macro block modes newly defined with respect to frames of the I-picture, the P-picture, and the B-picture and the priorities of the macro block modes according to the example embodiments are shown in Table 4, Table 5, and Table 6 below.

TABLE 4

| mb_type | Name of mb_type | transform_size_8 × 8_flag | MbPartPredMode (mb_type, 0) | Intra16 × 16 PredMode | CodedBlock Pattern Chroma | CodedBlock Pattern Luma |
|---|---|---|---|---|---|---|
| 0 | I_N × N | 0 | Intra_4 × 4 | na | 0 | TBA |
| 0 | I_N × N | 1 | Intra_8 × 8 | na | 0 | TBA |
| 1 | I_Direct | 1 | Intra_16 × 16 | inferred | 0 | 15 |
| 2 | I_16 × 16_0_0_0 | na | Intra_16 × 16 | 0 | 0 | 0 |
| 3 | I_16 × 16_1_0_0 | na | Intra_16 × 16 | 1 | 0 | 0 |
| 4 | I_16 × 16_2_0_0 | na | Intra_16 × 16 | 2 | 0 | 0 |
| 5 | I_16 × 16_3_0_0 | na | Intra_16 × 16 | 3 | 0 | 0 |
| 6 | I_16 × 16_0_0_1 | na | Intra_16 × 16 | 0 | 0 | 15 |
| 7 | I_16 × 16_1_0_1 | na | Intra_16 × 16 | 1 | 0 | 15 |
| 8 | I_16 × 16_2_0_1 | na | Intra_16 × 16 | 2 | 0 | 15 |
| 9 | I_16 × 16_3_0_1 | na | Intra_16 × 16 | 3 | 0 | 15 |
| inferred | I_Skip | na | Intra_16 × 16 | inferred | 0 | 0 |

TABLE 5

| mb_type | Name of mb_type | NumMbPart (mb_type) | MbPart PredMode (mb_type, 0) | MbPart PredMode (mb_type, 1) | MbPart Width (mb_type) | MbPart Height (mb_type) |
|---|---|---|---|---|---|---|
| 0 | P_Direct | 1 | Intra_16 × 16 | na | 16 | 16 |
| 1 | P_L0_16 × 16 | 1 | Pred_L0 | na | 16 | 16 |
| 2 | I_N × N | 0 | Intra_4 × 4 | na | | |
| 2 | I_N × N | 1 | Intra_8 × 8 | na | | |
| 3 | P_L0_L0_16 × 8 | 2 | Pred_L0 | Pred_L0 | 16 | 8 |
| 4 | P_L0_L0_8 × 16 | 2 | Pred_L0 | Pred_L0 | 8 | 16 |
| 5 | I_16 × 16_0_0_0 | na | Intra_16 × 16 | 0 | | |
| 6 | I_16 × 16_1_0_0 | na | Intra_16 × 16 | 1 | | |
| 7 | I_16 × 16_2_0_0 | na | Intra_16 × 16 | 2 | | |
| 8 | I_16 × 16_3_0_0 | na | Intra_16 × 16 | 3 | | |
| 9 | I_16 × 16_0_0_1 | na | Intra_16 × 16 | 0 | | |
| 10 | I_16 × 16_1_0_1 | na | Intra_16 × 16 | 1 | | |
| 11 | I_16 × 16_2_0_1 | na | Intra_16 × 16 | 2 | | |
| 12 | I_16 × 16_3_0_1 | na | Intra_16 × 16 | 3 | | |
| 13 | P_8 × 8 | 4 | na | na | 8 | 8 |
| 14 | P_8 × 8ref0 | 4 | na | na | 8 | 8 |
| inferred | P_Skip | 1 | Intra_16 × 16 | na | 16 | 16 |

TABLE 6

| mb_type | Name of mb_type | NumMbPart (mb_type) | MbPart PredMode (mb_type, 0) | MbPart PredMode (mb_type, 1) | MbPart Width (mb_type) | MbPart Height (mb_type) |
|---|---|---|---|---|---|---|
| 0 | B_Direct | na | Intra_16 × 16 | na | 16 | 16 |
| 1 | B_L0_16 × 16 | 1 | Pred_L0 | na | 16 | 16 |
| 2 | B_L1_16 × 16 | 1 | Pred_L1 | na | 16 | 16 |
| 3 | I_N × N | 0 | Intra_4 × 4 | na | | |
| 3 | I_N × N | 1 | Intra_8 × 8 | na | | |
| 4 | B_L0_L0_16 × 8 | 2 | Pred_L0 | Pred_L0 | 16 | 8 |
| 5 | B_L0_L0_8 × 16 | 2 | Pred_L0 | Pred_L0 | 8 | 16 |
| 6 | B_L1_L1_16 × 8 | 2 | Pred_L1 | Pred_L1 | 16 | 8 |
| 7 | B_L1_L1_8 × 16 | 2 | Pred_L1 | Pred_L1 | 8 | 16 |
| 8 | B_L0_L1_16 × 8 | 2 | Pred_L0 | Pred_L1 | 16 | 8 |
| 9 | B_L0_L1_8 × 16 | 2 | Pred_L0 | Pred_L1 | 8 | 16 |
| 10 | B_L1_L0_16 × 8 | 2 | Pred_L1 | Pred_L0 | 16 | 8 |
| 11 | B_L1_L0_8 × 16 | 2 | Pred_L1 | Pred_L0 | 8 | 16 |
| 12 | B_8 × 8 | 4 | na | na | 8 | 8 |
| 13 | I_16 × 16_0_0_0 | na | Intra_16 × 16 | 0 | | |
| 14 | I_16 × 16_1_0_0 | na | Intra_16 × 16 | 1 | | |
| 15 | I_16 × 16_2_0_0 | na | Intra_16 × 16 | 2 | | |
| 16 | I_16 × 16_3_0_0 | na | Intra_16 × 16 | 3 | | |
| 17 | I_16 × 16_0_0_1 | na | Intra_16 × 16 | 0 | | |
| 18 | I_16 × 16_1_0_1 | na | Intra_16 × 16 | 1 | | |
| 19 | I_16 × 16_2_0_1 | na | Intra_16 × 16 | 2 | | |
| 20 | I_16 × 16_3_0_1 | na | Intra_16 × 16 | 3 | | |
| inferred | B_Skip | na | Intra_16 × 16 | na | 8 | 8 |

The aforementioned intra-prediction mode and rearrangement of the priorities are optimized for characteristics of the depth image. However, the intra-SKIP mode or the intra-Direct mode of the intra-prediction mode may be inefficient for coding of the non-anchor frame because the inter-SKIP mode is stable in the non-anchor frame. Therefore, for efficient application of the SKIP mode and the Direct mode to the anchor frame and the non-anchor frame, efficiencies of the intra-SKIP mode and the inter-SKIP mode in the anchor frame and the non-anchor frame will be examined first. Generally, the intra-SKIP mode is more efficient in the anchor frame whereas the inter-SKIP mode is more efficient in the non-anchor frame. Therefore, to use both the intra-SKIP mode and the inter-SKIP mode compatibly, the more efficient prediction method may be applied in the intra-SKIP mode while another prediction method is used in the intra-Direct mode.

For example, in coding of the anchor frame, a highest priority may be given to the intra-SKIP mode and a second-highest priority may be given to the inter-SKIP mode. Conversely, in coding of the non-anchor frame, a highest priority may be given to the inter-SKIP mode and a second-highest priority may be given to the intra-SKIP mode.

Other than the above-suggested method, the priorities may be rearranged in various other combinations. In addition, the the inter-SKIP mode and the intra-SKIP mode may be distinguished by defining a flag bit after information on the SKIP mode and the other modes.

Figure 2:
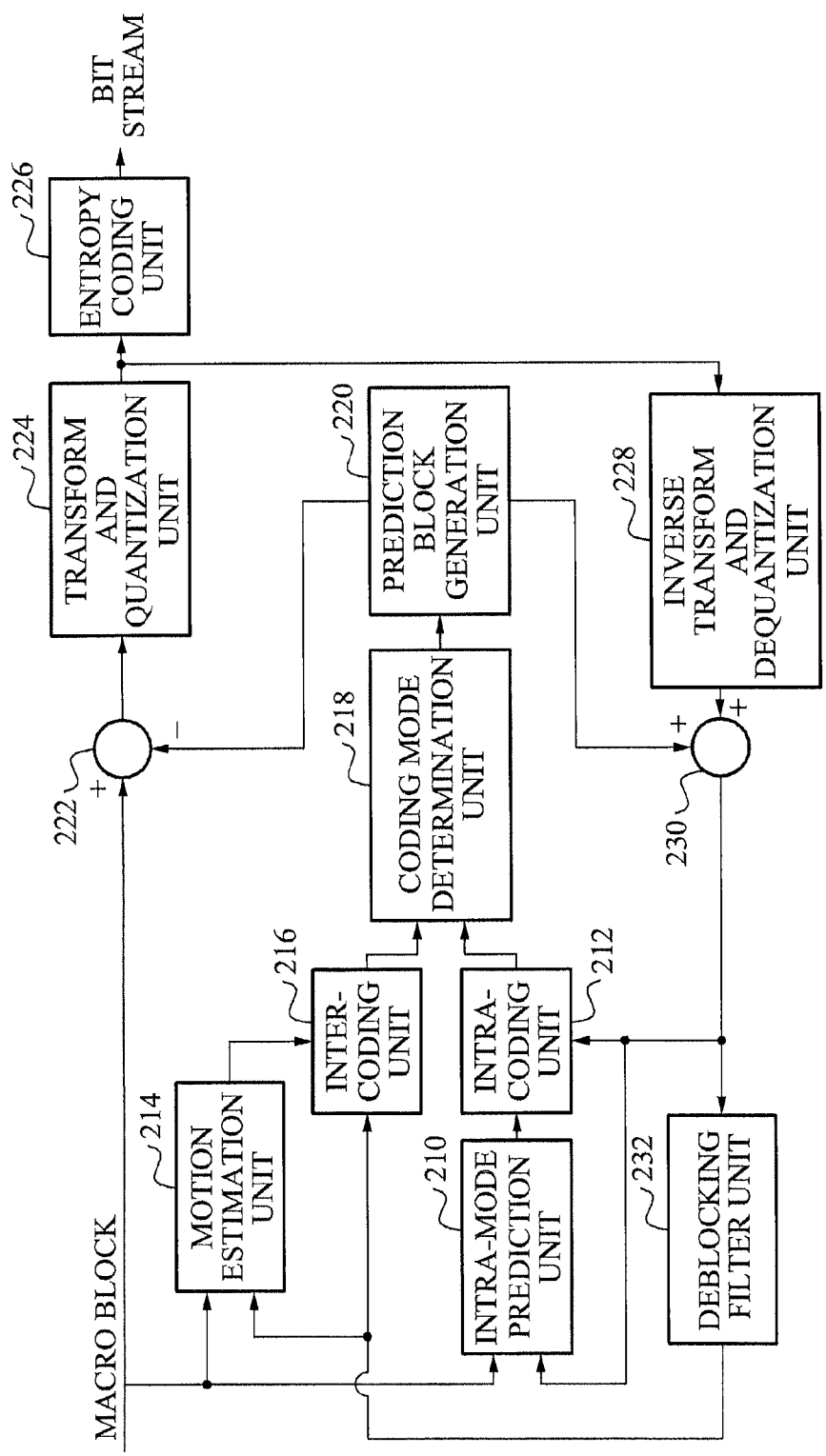
FIG. 2 illustrates a structure of a depth image coding apparatus for coding a depth image according to example embodiments.

FIG. 2 illustrates a structure of a depth image coding apparatus for a depth image according to example embodiments.

Referring to FIG. 2, the depth image coding apparatus may include an intra-mode prediction unit 210, an intra-coding unit 212, a motion estimation unit 214, an inter-coding unit 216, a coding mode determination unit 218, a prediction block generation unit 220, a differential unit 222, a transform and quantization unit 224, an entropy coding unit 226, an inverse transform and dequantization unit 228, a combination unit 230, and a deblocking filter unit 232.

The intra-mode prediction unit 210 may predict directivity of a current macro block using coded adjacent macro blocks.

The predicted directivity may be one of a vertical direction that generates a prediction block by vertically expanding the current macro block from an upper boundary pixel, a horizontal direction that generates the prediction block by horizontally expanding the current macro block from a left boundary pixel, a discrete cosine DC direction that generates the prediction block using a mean value of the upper boundary pixel and the left boundary pixel of the current macro block, and a plane direction that generates the prediction block considering both the upper boundary pixel and the left boundary pixel of the current macro block.

The intra-coding unit 212 may intra-code the current macro block according to intra-candidate coding modes.

The intra-candidate coding modes include an intra-prediction mode performing intra-coding using the predicted directivity. The intra-prediction mode may include at least one selected from an intra-skip mode, an intra-direct mode, and an intra-direction mode. The intra-skip mode is a mode for not transmitting predicted directivity information and a residual signal and to a decoding apparatus. The intra-direct mode is a mode for not transmitting the predicted directivity information to the decoding apparatus. The intra-direction mode a mode for not transmitting the residual signal to the decoding apparatus.

The intra-skip mode may have a highest priority or a second-highest priority among priorities of coding modes included in the intra-candidate coding modes and inter-candidate coding modes.

The intra-candidate coding modes may be classified according to a difference in at least one of a macro block size, whether directivity information is coded, and an existence of a residual signal regarding a luminance component of the macro block.

The motion estimation unit 214 may estimate a motion vector using a current macro block to be coded and a previously input macro block.

The inter-coding unit 216 may inter-code the current macro block according to each of the inter-candidate coding modes, based on the motion vector estimated by the motion estimation unit 214.

Here, the inter-candidate coding modes are coded by referring to one motion vector per one macro block. The inter-candidate coding modes may be classified according to the macro block size and whether the residual signal is coded. The macro block refers to a block being coded and having a maximum size. The macro block may be a size greater than 16×16.

The coding mode determination unit 218 may determine a coding mode having a lowest rate distortion optimization (RDO) cost among all coding modes included in the intra-candidate coding modes and the inter-candidate coding modes, as a coding mode of the current macro block, in consideration of the priorities of the coding modes.

The priorities of the coding modes included in the intra-candidate coding modes and the inter-candidate coding modes are set such that the intra-candidate coding modes have higher priorities than the inter-candidate coding modes.

Also, the priorities of the intra-candidate coding modes may be set in the following manners. A coding mode having a greater macro block size has a higher priority. A coding mode not coding directivity information has a higher priority than a coding mode coding the directivity information. A coding mode not coding a residual signal has a higher priority than a coding mode coding the residual signal. Additionally, a coding mode having directivity has a higher priority than a coding mode not having directivity.

The priorities of the inter-candidate coding modes are set such that a coding mode having a greater macro block size has a higher priority, a coding mode not coding a motion vector has a higher priority than a coding mode coding the motion vector, and a coding mode not coding a residual signal has a higher priority than a coding mode coding the residual signal.

Information on the priorities of the coding modes included in the intra-candidate coding modes and the inter-candidate coding modes may be preset or determined when a depth image is coded and then transmitted to a decoding apparatus.

The decoding mode determination unit 218 may change the priorities of the coding modes included in the intra-candidate coding modes and the inter-candidate coding modes, according to final determination of frequencies of the coding modes.

The prediction block generation unit 220 may generate the prediction block using the coding mode determined by the coding mode determination unit 218.

The differential unit 222 may subtract the prediction block from the current macro block, thereby generating a differential signal in units of the macro block.

The transform and quantization unit 224 may transform the differential signal generated by the differential unit 222 using a transform method and quantize the transformed differential signal, thereby generating a quantized transform coefficient. For example, the transform method may be discrete cosine transform (DCT).

The entropy coding unit 226 may generate a bit stream by entropy-coding coding information such as the quantized transform coefficient and the motion vector. In this instance, the bit stream generated is a coded depth image.

The inverse transform and dequantization unit 228 may dequantize the differential signal quantized by the transform and quantization unit 224 to use the differential signal in predicting a frame to be coded next, and then recover the differential signal to a state before the coding through inverse discrete cosine transform (IDCT).

The combination unit 230 may add the recovered differential signal and the generated prediction block by the prediction block generation unit 220, thereby recovering the current macro block not yet coded.

Figure 8:
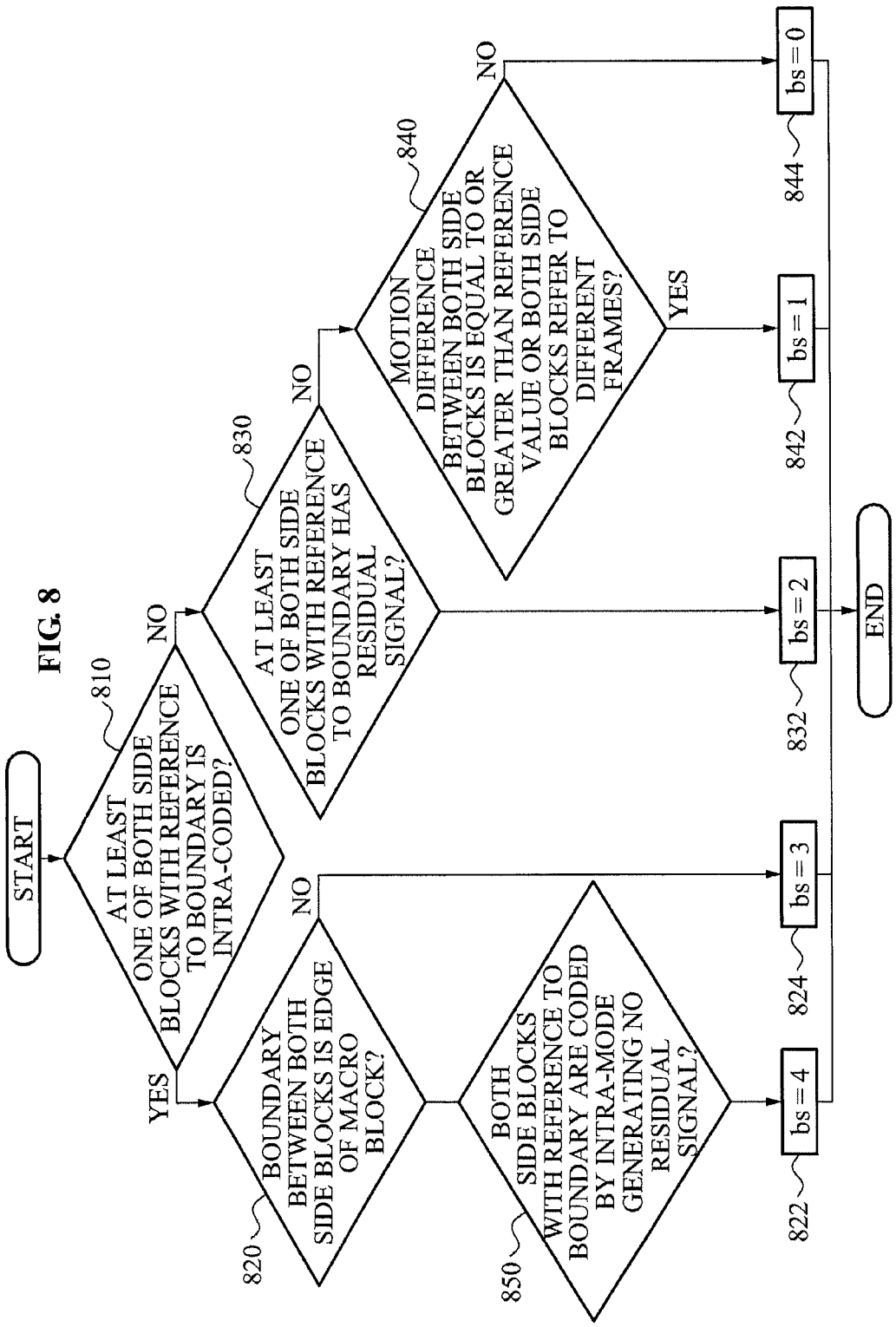
FIG. 8 illustrates a process of setting boundary strength (BS) for deblocking in a depth image coding apparatus or a depth image decoding apparatus according to example embodiments.

The deblocking filter unit 232 may remove blocking by filtering the recovered block or the recovered depth image. The deblocking filter unit 232 may perform filtering more strongly in an instance when either of blocks on both sides with reference to a block boundary is intra-coded than in an instance when both of the blocks on both sides are inter-coded. Here, the intra-coding includes the intra-prediction mode. The intra-prediction mode includes at least one selected from the intra-skip mode, the intra-direct mode, and the intra-direction mode. The deblocking filter unit 232 may set boundary strength (BS) as shown in FIG. 8.

Figure 3:
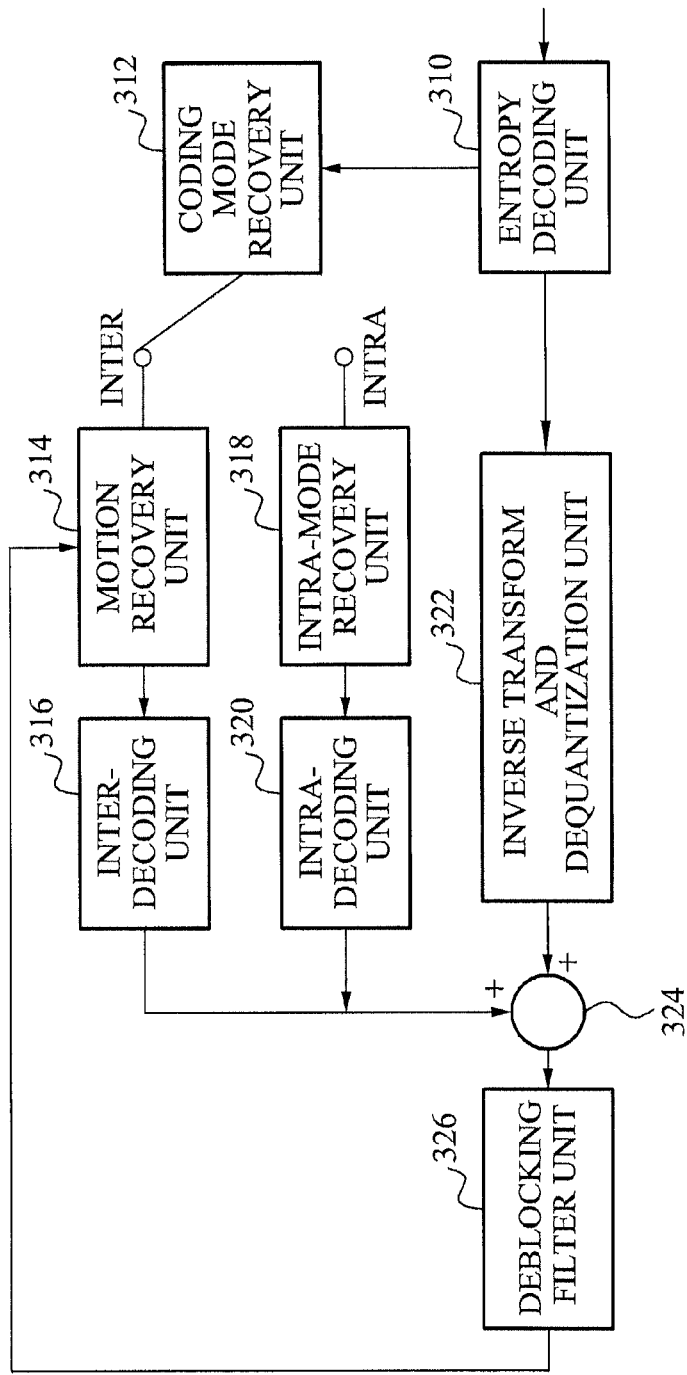
FIG. 3 illustrates a structure of a depth image decoding apparatus for decoding a depth image according to example embodiments.

FIG. 3 illustrates a structure of a depth image decoding apparatus for a depth image according to example embodiments.

Referring to FIG. 3, the depth image decoding apparatus may include an entropy decoding unit 310, a coding mode recovery unit 312, a motion recovery unit 314, an inter-decoding unit 316, an intra-mode recovery unit 318, an intra-decoding unit 320, an inverse transform and dequantization unit 322, a combination unit 324, and a deblocking filter unit 326.

The entropy decoding unit 310 may entropy-decode an input coded bit stream and thereby extract coding information such as a quantized coefficient of a difference image and a motion vector.

The coding mode recovery unit 312 may confirm a coding mode of a coded macro block using information on priorities of coding modes included in intra-candidate coding modes and inter-candidate coding modes.

The coding mode recovery unit 312 may vary the priorities of the coding modes included in the intra-candidate coding modes and the inter-candidate coding modes, according to frequency of the confirmed coding mode.

Information on the priorities of the coding modes included in the intra-candidate coding modes and the inter-candidate coding modes may be preset or determined when a depth image is decoded and then received by a coding apparatus.

The motion recovery unit 314 may confirm the motion vector of the coding information extracted by the entropy-decoding unit 310.

The inter-decoding unit 316 may generate a prediction block by performing inter-decoding using the motion vector confirmed by the motion recovery unit 314.

The intra-mode recovery unit 318 may predict directivity of the coded macro block using adjacent decoded macro blocks when the coding mode of the coded macro block is the intra-prediction mode. Here, the predicted directivity may be one of a vertical direction that generates a prediction block by vertically expanding the current macro block from an upper boundary pixel, a horizontal direction that generates the prediction block by horizontally expanding the current macro block from a left boundary pixel, a DC direction that generates the prediction block using a mean value of the upper boundary pixel and the left boundary pixel of the current macro block, and a plane direction that generates the prediction block considering both the upper boundary pixel and the left boundary pixel of the current macro block.

When the coding mode of the coded macro block is one of the intra-candidate coding modes, the intra-mode recovery unit 318 may confirm directivity information included in the received bit stream.

The intra-decoding unit 320 may generate the prediction block using the directivity information predicted or confirmed by the intra-mode recovery unit 318.

The inverse transform and dequantization unit 322 may dequantize the extracted quantized coefficient in units of the macro block, thereby generating a coefficient of a differential signal corresponding to inverse transform. The inverse transform and dequantization unit 322 may perform IDCT with respect to the generated coefficient of the difference image, thereby acquiring the differential signal. Accordingly, the coded bit stream is decoded and temporarily recovered to the depth image.

The combination unit 324 may add the differential signal and the prediction block, thereby recovering the depth image. The differential signal may be input from the inverse transform and dequantization unit 322 to the combination unit 324. The prediction block may be input from the inter-decoding unit 316 or the intra-decoding unit 320 to the combination unit 324.

The deblocking filter unit 326 may remove the blocking, by filtering the depth image recovered by the combination unit 324. The deblocking filter unit 326 may perform filtering more strongly when either of blocks on both sides with reference to a block boundary is intra-coded than when both of the blocks on both sides are inter-coded. Here, the intra-coding includes the intra-prediction mode. The intra-prediction mode includes at least one selected from the intra-skip mode, the intra-direct mode, and the intra-direction mode. The deblocking filter unit 326 may set the BS as shown in FIG. 8.

Figure 4:
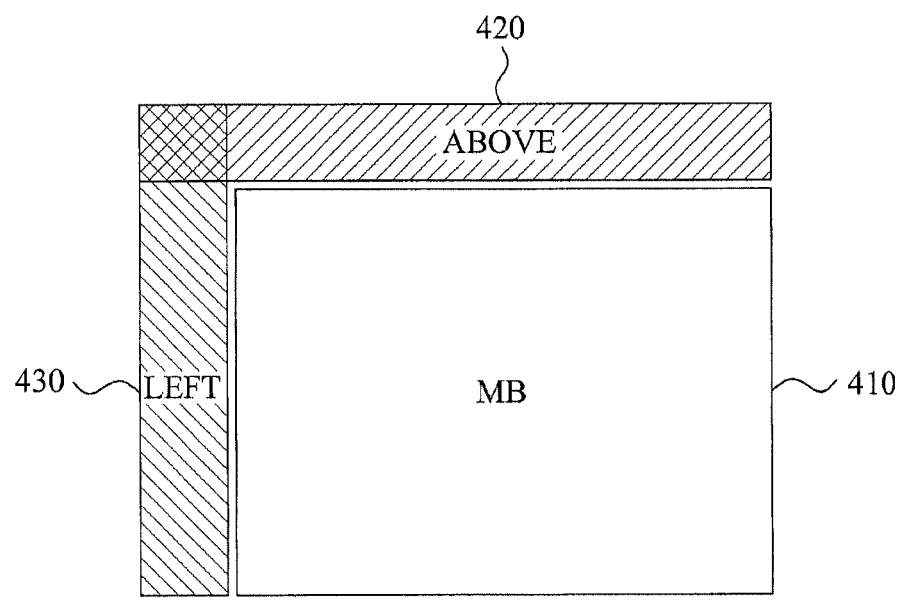
FIG. 4 illustrates an area referred to in predicting directivity for an intra-prediction mode, according to example embodiments.

The intra-mode prediction unit 210 of the coding apparatus and the intra-mode recovery unit 318 of the decoding apparatus may predict the directivity in the following manner as illustrated in FIG. 4.

FIG. 4 illustrates an area referred to in predicting directivity for an intra-prediction mode, according to example embodiments.

Referring to FIG. 2-FIG. 4, the intra-mode prediction unit 210 and the intra-mode recovery unit 318 compare complexities between boundary values of an upper block 420 and a left block 430 adjacent to the current macro block 410 and follow directivity of a more complex boundary, as shown in Equation 1.

$$L\_SSE = \sum_{i=0}^{i=16} (L(i) - L(i+1))^2 \qquad [\text{Equation 1}]$$

$$A\_SSE = \sum_{i=0}^{i=16} (A(i) - A(i+1))^2$$

if (L_SSE < A_SSE)

vertical direction else if (L_SSE > A_SSE)

horizontal direction else if (L_SSE == 0)

DC direction else

Plane direction

Here, SSE, which stands for a Sum of Squared Errors, corresponds to one of complexity measuring schemes. A_SSE refers to complexity of the boundary value of the upper block. L_SSE refers to complexity of the boundary value of the left block.

Equation 1 is used only as an example embodiment for prediction of directivity of the current macro block. Therefore, the directivity prediction may be performed by other methods using an already coded depth image of an adjacent view or using color information. Also, the directivity prediction may be performed by analyzing mode information, motion information, or analyzing an edge component of the adjacent block, not a boundary pixel of the adjacent block. In addition, the equation for acquiring the directivity information may use various differences such as a simple sum and variation, not a sum of squares of difference.

In addition to Equation 1, another method may be used for prediction of directivity. Such a method of predicting directivity using two complex measuring schemes will be described with reference to FIG. 5.

Figure 5:
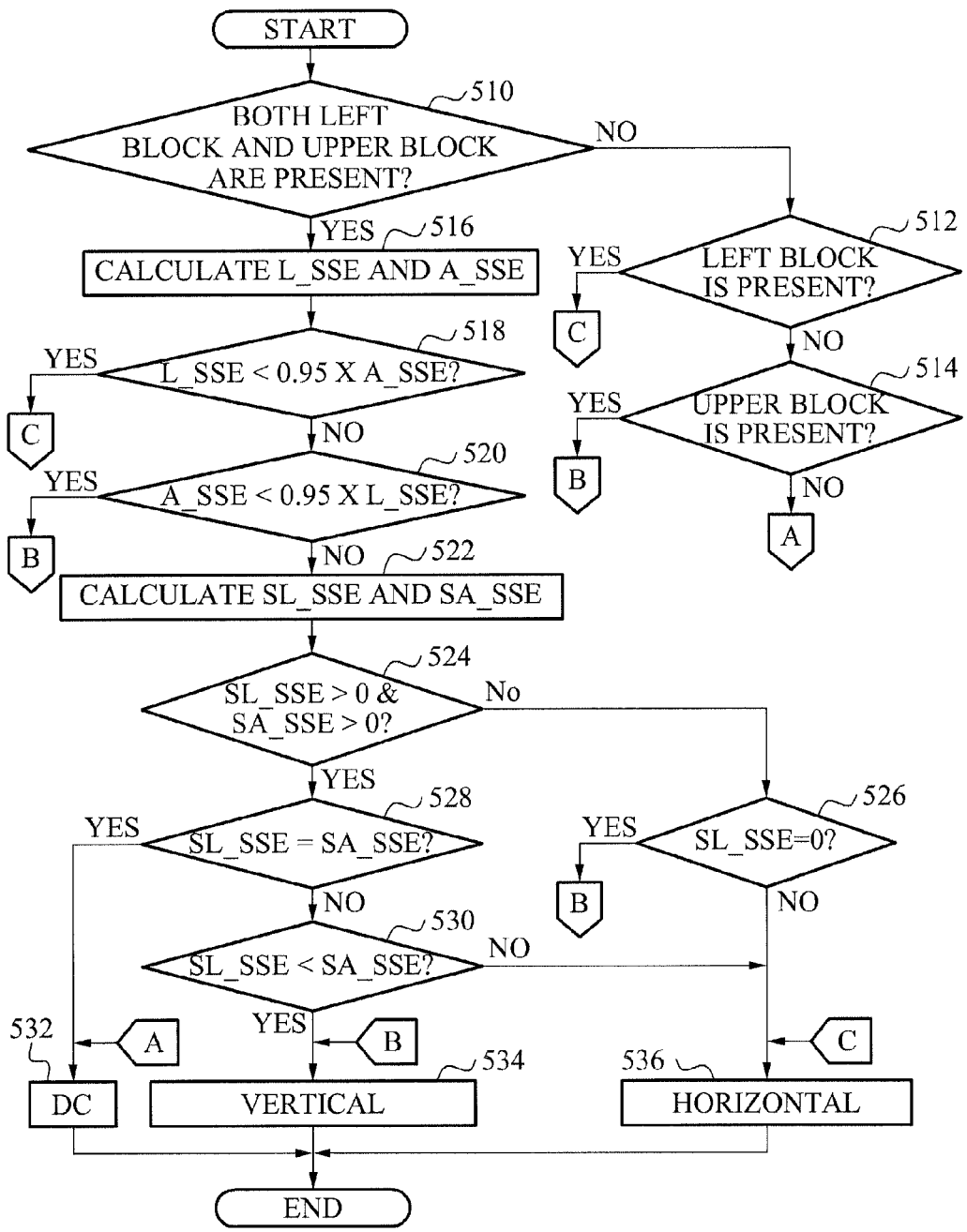
FIG. 5 illustrates a method of predicting directivity for an intra-prediction mode according to example embodiments.

FIG. 5 illustrates a method of predicting directivity for an intra-prediction mode according to example embodiments.

Referring to FIG. 5, in operation 510, a directivity prediction apparatus, for example, the intra-mode prediction unit 210 of FIG. 2 and the intra-mode recovery unit 318 of FIG. 3, may confirm whether both a left block and an upper block are present.

When only one of the left block and the upper block is determined to be present or both are determined to be absent as a result of operation 510, the directivity prediction apparatus may confirm whether the left block is present in operation 512.

When the left block is present in operation 512, the directivity prediction apparatus may determine the directivity to be horizontal in operation 536.

When the left block is determined to be absent in operation 512, the directivity prediction apparatus may confirm whether the upper block is present in operation 514.

When the upper block is determined to be present in operation 514, the directivity prediction apparatus may determine the directivity to be vertical in operation 534. When the upper block is also determined to be absent in operation 514, the directivity prediction apparatus may determine the directivity as a direct current (DC) in operation 532.

Further, when both the left block and the upper block are present as a result of operation 510, the directivity prediction apparatus may calculate L_SSE and A_SSE. Here, SSE, which stands for a Sum of Squared Errors, corresponds to one of complexity measuring schemes. A_SSE refers to complexity of a boundary value of the upper block, calculated using the SSE scheme. L_SSE refers to complexity of a boundary value of the left block, calculated using the SSE scheme.

In operation 518, the directivity prediction apparatus may confirm whether the L_SSE is less than the A_SSE multiplied by 0.95. In this instance, 0.95 may correspond to a weight predetermined for a margin of error.

When the L_SSE is less than the A_SSE multiplied by 0.95, as a result of operation 518, the directivity prediction apparatus may proceed with operation 536.

When the L_SSE is greater than or equal to the A_SSE multiplied by 0.95, as a result of operation 518, the directivity prediction apparatus may confirm whether the A_SSE is less than the L_SSE multiplied by 0.95 in operation 520. In this instance, 0.95 may correspond to a weight predetermined for a margin of error.

When the A_SSE is less than the L_SSE multiplied by 0.95 as a result of operation 520, the directivity prediction apparatus may proceed with operation 534.

When the A_SSE is greater than or equal to the L_SSE multiplied by 0.95, as a result of operation 520, the directivity prediction apparatus may calculate SL_SSE and SA_SSE in operation 522. Here, SSE, which stands for a Sum of Squared Errors, corresponds to one of complexity measuring schemes. SL_SSE, which stands for SSE of sorted left line, refers to complexity of a boundary value of a sorted left block, calculated using the SSE scheme. SA_SSE, which stands for SSE of sorted above line, refers to complexity of a boundary value of a sorted upper block, calculated using the SSE scheme.

In operation 524, the directivity prediction apparatus may confirm whether both the SL_SSE and the SA_SSE are greater than 0.

When both of the SL_SSE and the SA_SSE are not greater than 0 as a result of operation 524, the directivity prediction apparatus may confirm the SL_SSE equals 0 in operation 526. When the SL_SSE equals 0, the directivity prediction apparatus may proceed with operation 534. When the SL_SSE is not equal to 0, the directivity prediction apparatus may proceed with operation 536. In this instance, a case in which the SL_SSE or the SA_SSE equals 0 may refer to a case in which all pixels included in the left block or all pixels included in the upper block are identical to one another.

When both of the SL_SSE and the SA_SSE are greater than 0, as a result of operation 524, the directivity prediction apparatus may confirm whether the SL_SSE is equal to the SA_SSE in operation 528. When the SL_SSE is equal to the SA_SSE, as a result of operation 528, the directivity prediction apparatus may proceed with operation 532.

When the SL_SSE is not equal to the SA_SSE as a result of operation 528, the directivity prediction apparatus may confirm whether the SL_SSE is less than the SA_SSE in operation 530.

When the SL_SSE is less than the SA_SSE, as a result of operation 530, the directivity prediction apparatus may proceed with operation 534. When the SL_SSE is greater than or equal to the SA_SSE, as a result of operation 530, the directivity prediction apparatus may proceed with operation 536.

Although the complexity may be predicted using two complexity measuring schemes, SSE and S_SSE, in the description provided with reference to FIG. 5, other various complexity measuring schemes may be used as well.

In addition, a method of following directivity of a block having less complexity by comparing complexity of a boundary value of the upper block 420 and complexity of a boundary value of the left block 430 adjacent to the current macro block 410 of FIG. 4 has been employed as a criterion for prediction of directivity, however, a method of following directivity of a block having greater complexity may be employed.

That is, the method of predicting complexity of FIG. 5 may be arranged as follows. Directivity may be predicted using at least two complexity measuring schemes.

Complexity of a left block and complexity of an upper block may be measured using a first complexity measuring scheme. When the complexity of the left block and the complexity of the upper block are distinguishable in view of a margin of error, the directivity may be predicted based on the complexity measured using the first complexity measuring scheme.

However, when the complexity of the left block is similar to the complexity of the upper block within a margin of error, as a result of measuring the complexity of the left block and the complexity of the upper block using the first complexity measuring scheme, the complexity of the left block and the complexity of the upper block may be re-calculated using a second complexity measuring scheme, and the direcivity may be predicted based on the complexity measured using the second complexity measuring scheme.

The coding apparatus and the decoding apparatus suggested by the example embodiments are optimized for coding and decoding a depth image, however, is not limited thereto. That is, the coding apparatus and the decoding apparatus may be applicable to a black-and-white image, a medical image such as an X-ray image, and a color image having a flat characteristic.

Hereinafter, methods of coding and decoding a depth image using the intra-prediction mode in the above-structured depth image coding apparatus and depth image decoding apparatus will be described with reference to the accompanying drawings.

Figure 6:
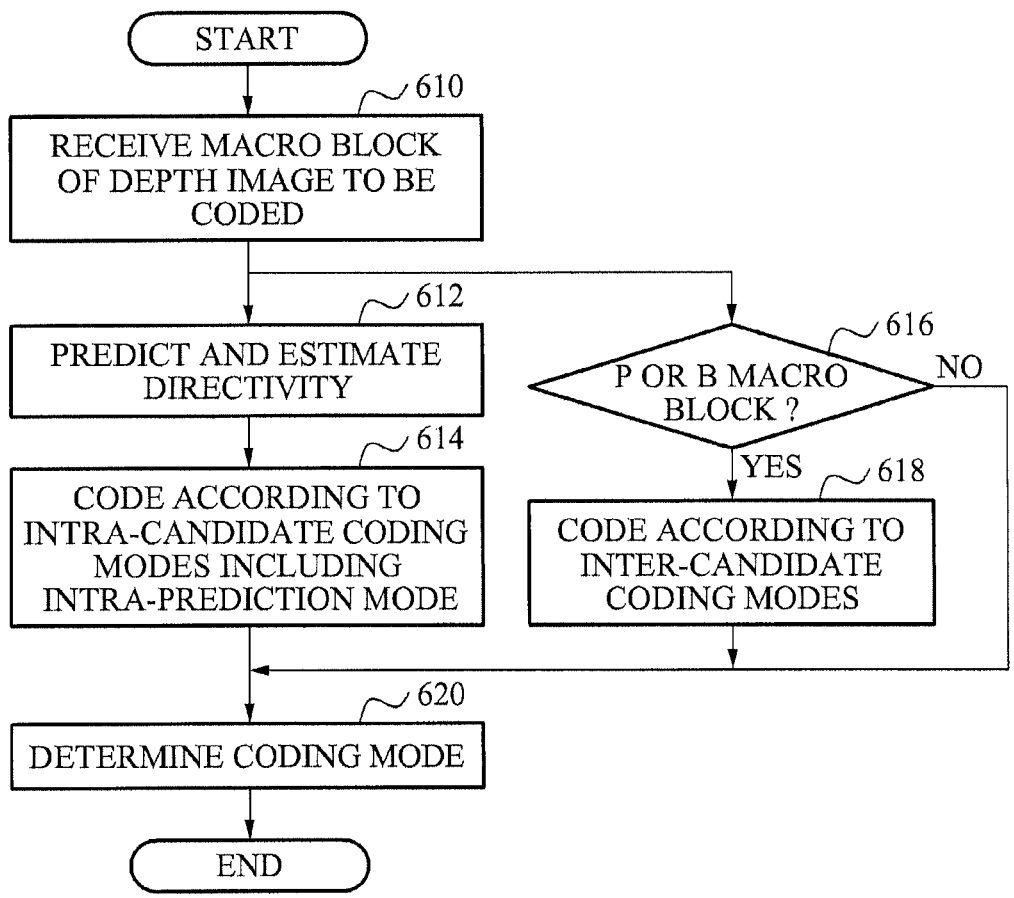
FIG. 6 illustrates a process of determining a coding mode in a depth image coding apparatus according to example embodiments.

FIG. 6 illustrates a process of determining a coding mode in a depth image coding apparatus according to example embodiments.

Referring to FIG. 6, in operation 610, the depth image coding apparatus receives a macro block of a depth image to be coded.

In operation 612, the depth image coding apparatus may predict directivity of a current macro block using adjacent macro blocks coded for an intra-prediction mode. In addition, the depth image coding apparatus may determine the directivity in terms of RDO for intra-candidate coding modes except for the intra-prediction mode.

In operation 614, the depth image coding apparatus may code the current macro block according to each of the intra-candidate coding modes.

Here, the intra-candidate coding modes include the intra-prediction mode. The intra-prediction mode may include at least one of the intra-skip mode, the intra-direct mode, and the intra-direction mode. The intra-skip mode codes predicted directivity information and a residual signal and fails to transmit the information and the residual signal to a decoding apparatus. The intra-direct mode codes the predicted directivity information and fails to transmit the predicted directivity information to the decoding apparatus. The intra-direction mode fails to transmit the residual signal to the decoding apparatus.

In addition, the intra-skip mode has a highest priority or a second-highest priority among priorities of coding modes included in the intra-candidate coding modes and inter-candidate coding modes. The intra-candidate coding modes may be classified according to a difference in at least one of a macro block size, whether directivity information is coded, and existence of a residual signal regarding a luminance component of the macro block.

In operation 616, the depth image coding apparatus confirms whether the current macro block corresponds to the P-picture or the B-picture.

When the current macro block does not correspond to the P-picture or the B-picture as a result of operation 616, the depth image coding apparatus may proceed with operation 620.

When the current macro block corresponds to the P-picture or the B-picture as a result of operation 616, the depth image coding apparatus may inter-code the current macro block according to each of the inter-candidate coding modes in operation 618.

In addition, in operation 620, the depth image coding apparatus may determine a coding mode having a lowest RDO cost among the coding modes included in the intra-candidate coding modes and the inter-candidate coding modes, as the coding mode of the current macro block, in consideration of the priorities of the coding modes.

Figure 7:
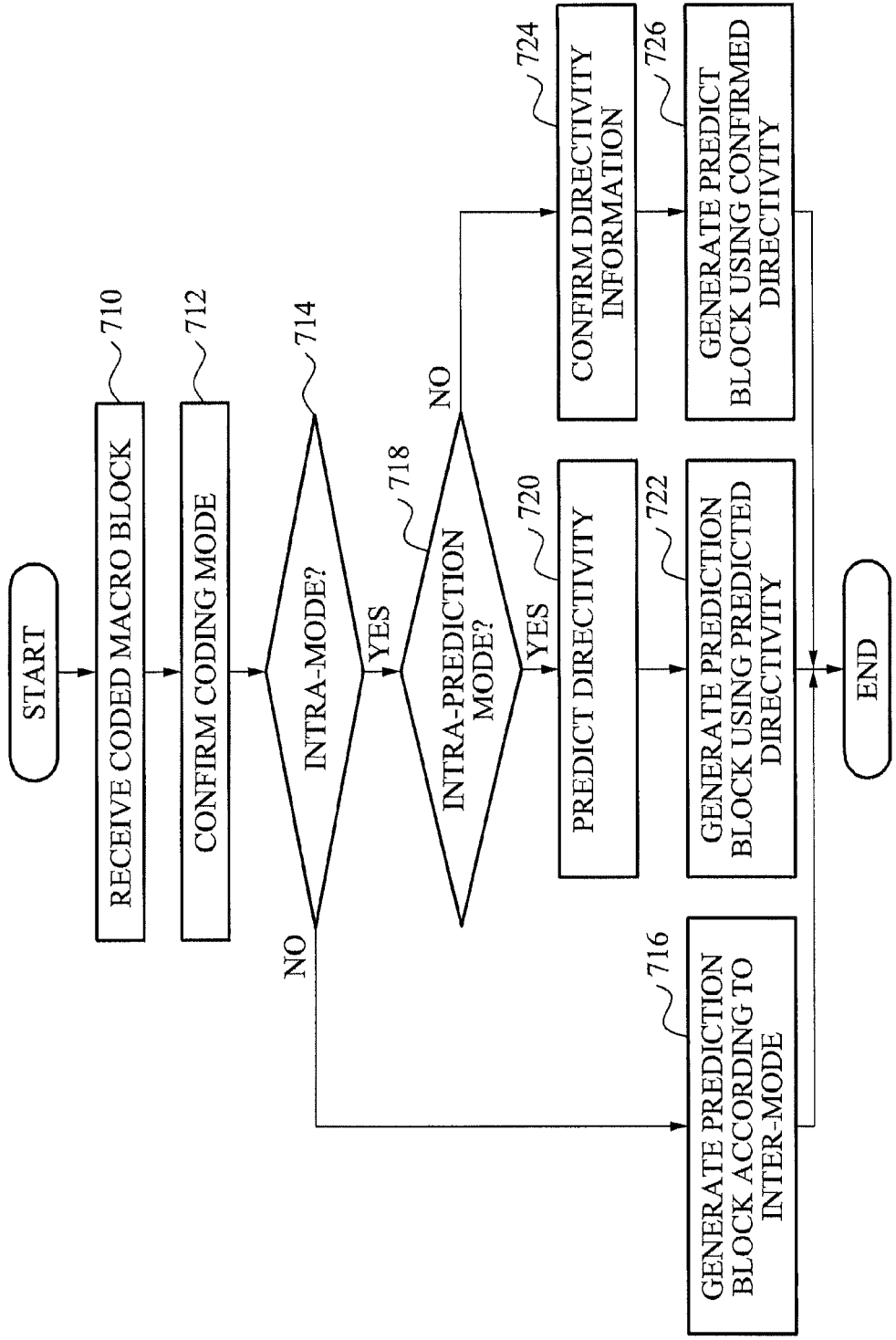
FIG. 7 illustrates a process of generating a prediction block for decoding in a depth image decoding apparatus according to example embodiments.

FIG. 7 illustrates a process of generating a prediction block for decoding in a depth image decoding apparatus according to example embodiments.

Referring to FIG. 7, the depth image decoding apparatus may receive a coded macro block in operation 710, and confirm a coding mode of the macro block by confirming coding information included in the coded macro block in operation 712.

In operation 714, the depth image decoding apparatus may confirm whether the coding mode of the coded macro block is an intra-mode.

When the coding mode is not the intra-mode as a result of operation 714, the depth image decoding apparatus generates the prediction block according to an inter-mode in operation 716.

When the coding mode is the intra-mode as a result of operation 714, the depth image decoding apparatus confirms whether the coding mode is an intra-prediction mode in operation 718.

When the coding mode is the intra-prediction mode as a result of operation 718, the depth image decoding apparatus may predict directivity of the coded macro block using decoded adjacent macro blocks in operation 720. In addition, the depth image decoding apparatus may generate the prediction block using the predicted directivity in operation 722.

When the coding mode is not the intra-prediction mode as a result of operation 718, that is, when the coding mode is one of the intra-candidate coding modes, the depth image decoding apparatus may confirm directivity information included in the coding information in operation 724. Also, in operation 726, the depth image decoding apparatus may generate the prediction block using the confirmed directivity information.

FIG. 8 illustrates a process of setting the BS for deblocking in a depth image coding apparatus or a depth image decoding apparatus according to example embodiments.

Referring to FIG. 8, in operation 810, deblocking filter units of the depth image coding apparatus or the depth image decoding apparatus may confirm whether any one of blocks on both sides with respect to a block boundary is intra-coded. Here, the intra-coding may include an intra-prediction mode. The intra-prediction mode may include at least one of the intra-skip mode, the intra-direct mode, and the intra-direction mode.

When any one of the blocks on both sides with reference to the block boundary is intra-coded as a result of operation 810, the deblocking filter unit confirms whether the boundary between the blocks on both sides is an edge of the macro block in operation 820.

When the boundary is not the edge of the macro block as a result of operation 820, the deblocking filter unit may set the BS to 3 in operation 824. The BS may be set to 0 to 4. Here, when the BS is 0, filtering is not performed. The BS 4 denotes a highest BS.

When the boundary is the edge of the macro block as a result of operation 820, the deblocking filter unit may confirm whether both of the blocks on both sides with reference to the block boundary are coded by an intra-mode not generating a residual signal based on a boundary in operation 850. Here, the intra-mode without the residual signal may include an intra-skip mode, an intra-direct mode, an intra-direction mode, and the like.

When both of the blocks on both sides with reference to the block boundary are coded by the intra-mode not generating a residual signal, as a result of operation 850, the deblocking filter unit may set the BS to 3 in operation 824.

However, when both of the blocks on both sides with reference to the block boundary are not coded by the intra-mode not generating a residual signal, as a result of operation 850, the deblocking filter unit may set the BS to 4 in operation 822.

When both of the blocks on both sides are inter-coded as a result of operation 810, the deblocking filter unit may confirm whether any one of the blocks on both sides include a residual signal in operation 830.

When any one of the blocks on both sides include the residual signal as a result of operation 830, the deblocking filter unit may set the BS to 2 in operation 832.

When none of the blocks on both sides include the residual signal as a result of operation 830, in operation 840, the deblocking filter unit may confirm whether a difference of motions of the blocks on both sides is equal to or greater than a reference value or whether the blocks on both sides refer to different frames.

When the difference of motions is equal to or greater than the reference value or the blocks on both sides refer to different frames as a result of operation 840, the deblocking filter unit may set the BS to 1 in operation 842.

When the difference of motions is less than the reference value and the blocks on both sides refer to the same frame as a result of operation 840, the deblocking filter unit may set the BS to 0 in operation 844.

Referring to FIG. 8, in case of the intra-coding, the BS may be set by operation 822 or operation 824. In case of the inter-coding, the BS may be set by operation 832, operation 842, or operation 844. Comparing the set BS values, filtering is performed more strongly in case of the intra-coding than the inter-coding. That is, since the intra-prediction mode including at least one of the intra-skip mode, the intra-direct mode, and the intra-direction mode is included in the intra-coding, filtering is performed relatively strongly in the intra-prediction mode in comparison to the inter-coding.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A depth image coding apparatus, comprising:
an intra-mode prediction unit to predict directivity of a current macro block using coded adjacent macro blocks;
an intra-coding unit to intra-code the current macro block according to each of intra-candidate coding modes;
an inter-coding unit to inter-code the current macro block according to each of inter-candidate coding modes; and
a coding mode determination unit to determine a coding mode having a lowest rate distortion optimization (RDO) cost among coding modes included in the intra-candidate coding modes and the inter-candidate coding modes as a coding mode of the current macro block, in consideration of priorities of the coding modes,
wherein the coding mode determination unit varies the priorities of the coding modes included in the inter-candidate coding modes and the inter-candidate coding modes, according to a final determination of frequencies of the coding modes,
wherein the intra-candidate coding modes comprise an intra-prediction mode for intra-coding using the predicted directivity.

2. The depth image coding apparatus of claim 1, wherein the intra-mode prediction unit measures a complexity of a left block of the current macro block and a complexity of an upper block of the current macro block using a first complexity measuring scheme, and predicts the directivity using a result of the measuring, and
when the complexity of the left block of the current macro block is similar to the complexity of the upper block of the current macro block within a predetermined margin of error as a result of the measuring using the first complexity measuring scheme, the intra-mode prediction unit measures the complexity of the left block of the current macro block and the complexity of the upper block of the current macro block using a second complexity measuring scheme, and predicts the directivity using a result of the measuring using the second complexity measuring scheme.

3. The depth image coding apparatus of claim 1, wherein the intra-prediction mode comprises at least one selected from an intra-skip mode, an intra-direct mode, and an intra-direction mode,
the intra-skip mode skips trasmitting predicted directivity information and a residual signal to a decoding apparatus,
the intra-direct mode transmits the residual signal to the decoding apparatus, and
the intra-direction mode transmits the predicted directivity information to the decoding apparatus.

4. The depth image coding apparatus of claim 3, wherein the intra-skip mode has a highest priority or a second-highest priority of the priorities of the coding modes included in the intra-candidate coding modes and the inter-candidate coding modes.

5. The depth image coding apparatus of claim 1, wherein the predicted directivity comprises one of a vertical direction that generates a prediction block by vertically expanding the current macro block from an upper boundary pixel, a horizontal direction that generates the prediction block by horizontally expanding the current macro block from a left boundary pixel, a discrete cosine DC direction that generates the prediction block using a mean value of the upper boundary pixel and the left boundary pixel of the current macro block, and a plane direction that generates the prediction block considering both the upper boundary pixel and the left boundary pixel of the current macro block.

6. The depth image coding apparatus of claim 1, wherein the intra-candidate coding modes are classified according to a difference in at least one of a macro block size, whether directivity information is coded, and existence of a residual signal regarding a luminance component of the macro block.

7. The depth image coding apparatus of claim 1, wherein
the inter-candidate coding modes refer to one motion vector per macro block, and
the inter-candidate coding modes are classified according to a difference in at least one of a macro block size, whether the motion vector is coded, and whether a residual signal is coded.

8. The depth image coding apparatus of claim 1, wherein the priorities of the coding modes included in the intra-candidate coding modes and the inter-candidate coding modes are set such that the intra-candidate coding modes have higher priorities than the inter-candidate coding modes.

9. The depth image coding apparatus of claim 1, wherein the priorities of the intra-candidate coding modes are set such that
a coding mode having a greater macro block size has a higher priority,
a coding mode not coding directivity information has a higher priority than a coding mode coding the directivity information,
a coding mode not coding a residual signal has a higher priority than a coding mode coding the residual signal, and
a coding mode having directivity has a higher priority than a coding mode not having directivity.

10. The depth image coding apparatus of claim 1, wherein the priorities of the inter-candidate coding modes are set such that
a coding mode having a greater macro block size has a higher priority,
a coding mode not coding a motion vector has a higher priority than a coding mode coding the motion vector, and
a coding mode not coding a residual signal has a higher priority than a coding mode coding the residual signal.

11. The depth image coding apparatus of claim 1, wherein information on the priorities of the coding modes included in the intra-candidate coding modes and the inter-candidate coding modes is preset or determined when a depth image is coded and then transmitted to a decoding apparatus.

12. The depth image coding apparatus of claim 1, wherein the current macro block comprises one of a macro block of a depth image, a macro block of a black and white image, a macro block of a color image having a flat characteristic, and a macro block of an X-ray image.

13. The depth image coding apparatus of claim 1, further comprising a deblocking filter unit to remove blocking by filtering a recovered block using the prediction block,
wherein the deblocking filter unit performs filtering more strongly in an instance when either of blocks on both sides with reference to a block boundary is intra-coded than in an instance when both of the blocks on both sides are inter-coded.

14. A depth image decoding apparatus comprising:
a coding mode recovery unit to confirm a coding mode of a coded macro block being received;
an intra-mode recovery unit to predict directivity of the coded macro block using decoded adjacent macro blocks when the coding mode of the coded macro block is an intra-prediction mode; and
an intra-decoding unit to generate a prediction block using the predicted directivity
wherein
the coding mode recovery unit confirms the coding mode of the macro block using information on priorities of coding modes included in intra-candidate coding modes and inter-candidate coding modes, and
the intra-prediction mode is included in the intra-candidate coding modes
wherein the coding mode recovery unit varies the priorities of the coding modes included in the intra-candidate coding modes and the inter-candidates coding modes, according to a final determination of frequencies of the code modes.

15. The depth image decoding apparatus of claim 14, wherein
the intra-mode prediction unit measures a complexity of a left block of the current macro block and a complexity of an upper block of the current macro block using a first complexity measuring scheme, and predicts the directivity using a result of the measuring, and
when the complexity of the left block of the current macro block is similar to the complexity of the upper block of the current macro block within a predetermined margin of error as a result of the measuring using the first complexity measuring scheme, the intra-mode prediction unit measures the complexity of the left block of the current macro block and the complexity of the upper block of the current macro block using a second complexity measuring scheme, and predicts the directivity using a result of the measuring using the second complexity measuring scheme.

16. The depth image decoding apparatus of claim 14, wherein the information on the priorities of the coding modes included the intra-candidate coding modes and the inter-candidate coding modes is preset or determined when a depth image is decoded and then received by a coding apparatus.

17. The depth image decoding apparatus of claim 14, wherein the predicted directivity comprises one of a vertical direction that generates a prediction block by vertically expanding the coded macro block from an upper boundary pixel, a horizontal direction that generates the prediction block by horizontally expanding the coded macro block from a left boundary pixel, a DC direction that generates the prediction block using a mean value of the upper boundary pixel and the left boundary pixel of the coded macro block, and a plane direction that generates the prediction block considering both the upper boundary pixel and the left boundary pixel of the coded macro block.

18. The depth image decoding apparatus of claim 14, wherein
the intra-prediction mode comprises at least one selected from an intra-skip mode, an intra-direct mode, and an intra-direction mode,
the intra-skip mode skips receiving predicted directivity information and a residual signal,
the intra-direct mode receives the residual signal, and the intra-direction mode receives the predicted directivity information.

19. The depth image decoding apparatus of claim 14, further comprising a deblocking filter unit to remove blocking by filtering a recovered block using the prediction block,
wherein the deblocking filter unit performs filtering more strongly in an instance when either of blocks on both sides with reference to a block boundary is intra-coded than in an instance when both of the blocks on both sides are inter-coded.

20. A depth image coding method comprising:
predicting directivity of a current macro block using coded adjacent macro blocks;
intra-coding the current macro block according to each of intra-candidate coding modes;
inter-coding the current macro block according to each of inter-candidate coding modes when the current macro block corresponds to a P-picture or a B-picture; and
determining a coding mode having a lowest rate distortion optimization (RDO) cost among coding modes included in the intra-candidate coding modes and the inter-candidate coding modes as a coding mode of the current macro block, in consideration of priorities of the coding modes,
wherein the coding mode determination unit varies the priorities of the coding modes included in the intra-candidate coding modes and the inter-candidate coding modes, determining a coding mode according to a final determination of frequencies of the coding modes,
wherein the intra-candidate coding modes comprise an intra-prediction mode for intra-coding using the predicted directivity.

21. The depth image coding method of claim 20, wherein the intra-prediction mode comprises at least one selected from an intra-skip mode, an intra-direct mode, and an intra-direction mode,
the intra-skip mode codes predicted directivity information and a residual signal and skips transmitting the residual signal and the information to a decoding apparatus,
the intra-direct mode codes the transmit the residual signal to the decoding apparatus, and
the intra-direction mode transmits the predicted directivity information to the decoding apparatus.

22. The depth image coding method of claim 21, wherein the intra-skip mode has a highest priority or a second-highest priority of the priorities of the coding modes included in the intra-candidate coding modes and the inter-candidate coding modes.

23. The depth image coding method of claim 20, wherein the predicted directivity comprises one of a vertical direction that generates a prediction block by vertically expanding the current macro block from an upper boundary pixel, a horizontal direction that generates the prediction block by horizontally expanding the current macro block from a left boundary pixel, a DC direction that generates the prediction block using a mean value of the upper boundary pixel and the left boundary pixel of the current macro block, and a plane direction that generates the prediction block considering both the upper boundary pixel and the left boundary pixel of the current macro block.

24. A depth image decoding method comprising:
confirming a coding mode of a coded macro block using information on priorities of coding modes included intra-candidate coding modes and inter-candidate coding modes;

predicting directivity of the coded macro block using decoded adjacent macro blocks when the coding mode of the coded macro block is an intra-prediction mode; and generating a prediction block using the predicted directivity wherein information on the priorities of the coding modes included in the intra-candidate coding modes and the inter-candidate coding modes is preset or determined when a depth image is decoded, wherein the coding mode determination unit varies the priorities of the coding modes included in the intra-candidate coding modes and the inter-candidate coding modes, confirming a coding mode according to a final determination of frequencies of the code modes.

25. The depth image decoding method of claim 24, wherein the predicted directivity comprises one of a vertical direction that generates a prediction block by vertically expanding the coded macro block from an upper boundary pixel, a horizontal direction that generates the prediction block by horizontally expanding the coded macro block from a left boundary pixel, a DC direction that generates the prediction block using a mean value of the upper boundary pixel and the left boundary pixel of the coded macro block, and a plane direction that generates the prediction block considering both the upper boundary pixel and the left boundary pixel of the coded macro block.

26. The depth image decoding method of claim 24, wherein the intra-prediction mode comprises at least one selected from an intra-skip mode, an intra-direct mode, and an intra-direction mode, the intra-skip mode skips receiving predicted directivity information and a residual signal from a coding apparatus, the intra-direct mode receives the residual signal, and the intra-direction mode receives the predicted directivity information.

\* \* \* \* \*

UNITED STATES PATENT AND TRADEMARK OFFICE
CERTIFICATE OF CORRECTION

| | | |
|---|---|---|
| PATENT NO. | : 8,902,982 B2 | Page 1 of 1 |
| APPLICATION NO. | : 13/350250 | |
| DATED | : December 2, 2014 | |
| INVENTOR(S) | : Kwan Jung Oh et al. | |

It is certified that error appears in the above-identified patent and that said Letters Patent is hereby corrected as shown below:

On the title page:

Item (30) Foreign Application Priority Data, Insert
--Dec. 23, 2011 (KR) .................. 10-2011-0141112--

Signed and Sealed this
Third Day of March, 2015

Michelle K. Lee
*Deputy Director of the United States Patent and Trademark Office*